United States Patent
Rakoczi et al.

(10) Patent No.: US 11,757,329 B2
(45) Date of Patent: Sep. 12, 2023

(54) VENTILATOR FOR A CONTROL DEVICE FOR A VEHICLE AND CONTROL DEVICE WITH A VENTILATOR

(71) Applicant: ZF Friedrichshafen AG, Friedrichshafen (DE)

(72) Inventors: Viktor Rakoczi, Immenstaad am Bodensee (DE); Michael Keckeisen, Meckenbeuren (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 343 days.

(21) Appl. No.: 16/860,401

(22) Filed: Apr. 28, 2020

(65) Prior Publication Data
US 2020/0343790 A1    Oct. 29, 2020

(30) Foreign Application Priority Data
Apr. 29, 2019  (DE) .......................... 102019206081.1

(51) Int. Cl.
| | | |
|---|---|---|
| H02K 7/14 | (2006.01) | |
| B60H 1/00 | (2006.01) | |
| F04D 25/06 | (2006.01) | |
| H02K 1/27 | (2022.01) | |
| H02K 1/274 | (2022.01) | |

(52) U.S. Cl.
CPC .......... *H02K 7/14* (2013.01); *B60H 1/00428* (2013.01); *B60H 1/00464* (2013.01); *F04D 25/0606* (2013.01); *H02K 1/274* (2013.01); *B60H 2001/00614* (2013.01)

(58) Field of Classification Search
CPC ............ B60H 1/00428; B60H 1/00464; B60H 2001/00614; H02K 21/14; H02K 41/031; H02K 21/18; H02K 1/274; H02K 7/14; F04D 19/002; F04D 25/0606; F04D 29/326
USPC ....................................... 417/423.7
See application file for complete search history.

(56) References Cited

U.S. PATENT DOCUMENTS

| | | | | |
|---|---|---|---|---|
| 4,883,408 A | * | 11/1989 | Borcherding | F04D 29/263 416/241 A |
| 6,690,145 B2 | * | 2/2004 | Stevens | H02P 9/48 323/273 |
| 6,717,314 B2 | * | 4/2004 | Horst | D06F 37/304 310/156.01 |
| 7,044,202 B2 | * | 5/2006 | Lopatinsky | H01L 23/467 257/722 |

(Continued)

FOREIGN PATENT DOCUMENTS

DE     10 2017 002 601 A1    9/2018

OTHER PUBLICATIONS

Office Action dated Jan. 14, 2020 for German Patent Application No. 10 2019 206 081.1, (12 pp.), note: pp. 1 and 2 are English language Explanations to Section C. Result of Determination Document.

*Primary Examiner* — Alex W Mok
(74) *Attorney, Agent, or Firm* — Crowell & Moring LLP

(57) ABSTRACT

A ventilator for a control device for a vehicle may include a stator having a plurality of coils and a rotor comprising a hollow cylinder. An impeller may include a plurality of blades, the impeller being coupled to the hollow cylinder such that a rotation of the hollow cylinder causes a rotation of the impeller. The hollow cylinder may have a plurality of magnets. The stator may partially encompasses the rotor.

15 Claims, 2 Drawing Sheets

(56) References Cited

U.S. PATENT DOCUMENTS

| | | | |
|---|---|---|---|
| 7,607,197 B1 * | 10/2009 | Bartsch | A47L 9/2857 15/413 |
| 7,977,831 B2 * | 7/2011 | De Filippis | H02K 9/14 310/58 |
| 10,113,761 B2 * | 10/2018 | Munn | F04D 25/04 |
| 2008/0157634 A1 | 7/2008 | Sekiguchi et al. | |

* cited by examiner

VENTILATOR FOR A CONTROL DEVICE FOR A VEHICLE AND CONTROL DEVICE WITH A VENTILATOR

RELATED APPLICATION

This application claims the benefit of, and priority to, German Patent Application DE 10 2019 206 081.1, filed Apr. 29, 2019, which is incorporated by reference herein in its entirety.

TECHNICAL FIELD

The present aspects relate to a ventilator for a control device for a vehicle and a control device with a ventilator.

BACKGROUND

An electronic control device for a motor vehicle is known from DE 10 2017 002 601 A1, which has a gas cooling channel for a condensed gas. The gas cooling channel is connected to a control logic in a thermally conductive manner and designed to separate the condensed gas from the control logic. The gas cooling channel has a relief section in which a flow cross section of the gas cooling channel is expanded in order to relieve and cool the condensed gas for cooling the control logic.

The ventilator according to the present aspects for a control device for a vehicle, and the control device according to the present aspects that has a ventilator with the features of the independent claims have the advantage in this regard that a weight advantage is obtained by a stator that has numerous coils, wherein the stator is in the form of an open hollow cylinder. Furthermore, the stator grooves for the windings of the coils are closer to one another in that the stator is in the form of an open hollow cylinder, because there is less circumference for the same number of stator grooves. As a result, the magnets of the rotor can overcome the step from one stator groove to the next with less energy input. Furthermore, because of the closer stator grooves, a better contact cooling of the control device housing can be obtained.

BRIEF DESCRIPTION OF THE DRAWINGS

Exemplary embodiments of the present aspects are explained in greater detail in the following explanation, and are shown in the drawings. Therein.

DETAILED DESCRIPTION

Figure 1:
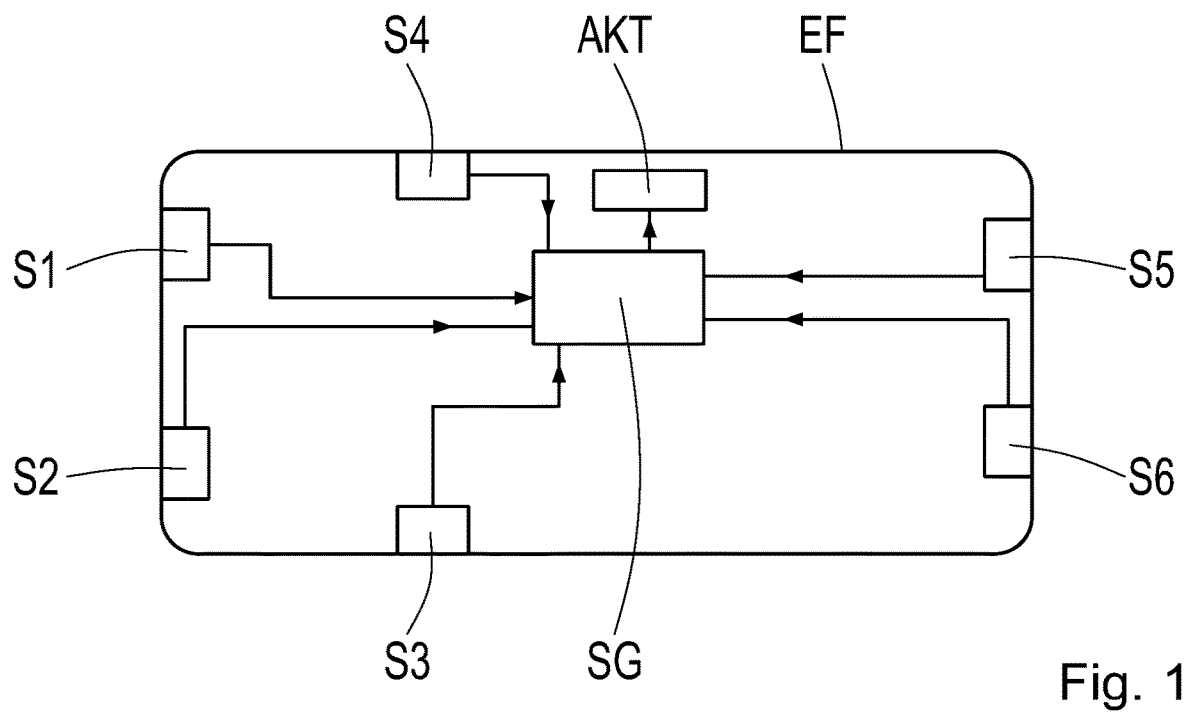
FIG. 1 shows a block diagram of a vehicle with the control device according to the present aspects, and connecting elements.

In view of the background above, a ventilator is provided in this description, which may be designed as a brushless, electronically commutated synchronous motor, for a control device for a vehicle with a stator that has numerous coils, wherein the stator is designed as an open hollow cylinder. Optionally, there is also a rotor in the form of a hollow cylinder, wherein an impeller with numerous blades and the hollow cylinder are connected such that a rotation of the hollow cylinder results in a rotation of the impeller. The hollow cylinder has numerous magnets, wherein the stator only partially encompasses the rotor. For this, the stator has a greater radius than the rotor.

In the present context, a ventilator is understood to be a mechanism that moves air or some other gas for cooling purposes in that the gas or the air removes the heat from the heated structure. Such a ventilator has a stator and a rotor, wherein the rotor can rotate and a movement of the rotor, may be obtained through a traveling wave applied to the coils of the stator. This rotation of the rotor results in a vacuuming off of the air and thus a removal of heat at the elements in the control device that are to be cooled.

A control device receives sensor signals or other stator may signal and generate actuating signals from these for an actuator or for a display. Such a control device normally has a housing made of plastic and/or metal. Various electrical and electronic components are located in the control device. These preferably include a computer, in particular so-called graphics processors, which are connected to other components, and capable of a very high computing power. This high computing power may result, however, in a high heat output, which must be cooled. For this, the ventilator according to the present aspects is proposed, e.g., for each graphics processor in the control device. There are, however, other processors and power electronics components that also generate heat. If this heat is not dissipated, the functionality of the components in the control device may be compromised, or they could even be destroyed. A dangerous heating of the entire control device can also result in negative consequences for the vehicle.

The vehicle can be a passenger car, a truck, an off-road vehicle, or other vehicles, e.g. boats or ships.

The stator may be a component that has numerous coils in the present case. These coils are actuated by the control device, e.g. with an electronic circuit, by an electrical current, such that a rotating magnetic field is generated, which turns the rotor, which can also be referred to as a permanently excited rotor in the present context. This movement of the travelling wave then corresponds to the rotation of the rotor. The stator itself is stationary, and designed as an open hollow cylinder in the present case. An open hollow cylinder means that the hollow cylinder is not closed. In particular, this open hollow cylinder only has a sheath on one half. This means that the other half is completely open. If the same number of coils is used as with a closed hollow cylinder, the coils are closer to one another. This then results in the advantages specified above. The coils are wound, e.g., on grooves, wherein the grooves are made from laminated cores, in order to thus result in an optimal formation of the electromagnetic field.

A coil in the present context may be understood to be an electrical component with an inductance that therefore generates a magnetic field when subjected to a preferably constant current. A coil is wound in the present context, and is wound around a core, for example, as indicated above, in order to thus form an optimal field.

The rotor is a rotating component, as indicated above, which can therefore be rotated. In the present case, this rotation may be caused by the magnetic travelling wave from the coils, referred to above. For this, the rotor has magnets in its sheath, e.g. placed in blind holes. The magnets are permanent magnets, which may be arranged radially around the axis of rotation for the rotor, preferably in an alternating pattern with regard to their poles. This means that when seen from the side, the north and south poles alternate successively. The rotor itself is in the form of a hollow cylinder, wherein an impeller with numerous blades is connected to the hollow cylinder such that a rotation of the hollow cylinder results in a rotation of the impeller. This means that when the hollow cylinder with the magnets rotates, the impeller rotates with the blades and thus causes the suction for the air. As an exemplary embodiment, the impeller can therefore be produced integrally with the hollow cylinder. It can however also be connected to the hollow cylinder in another manner through a force, form, and/or material bonding connection.

Because the stator is in the form of an open hollow cylinder, and has a greater diameter than the rotor, the stator may only partially encompass this rotor. By way of example, this encompassing may only be over half, or even less than half, of the circumference.

For the control device, the rotor may be inserted into a housing for the control device with a mount that retains the rotor such that it can rotate laterally. This partial encompassing of the rotor by the stator facilitates the installation of the rotor with this mount. As a result, it can be easily replaced by untrained personnel. This is because the rotor is releasably connected to the housing with the mount. As can be derived from the dependent claims, such a releasable connection can be obtained through at least one snap-fit connector. Any other snap in connection that ultimately creates the connection through a form-fit can be used.

The impeller may be rotatably mounted on a shaft, wherein the shaft is connected to a mount via a suspension, wherein the mount is concave, and partially encompasses the rotor. There may therefore be a shaft on which the impeller is mounted, and this shaft is connected to the mount via a suspension. The mount ultimately serves as a handle for removing the unit comprising the rotor and the mount. The mount more or less mirrors the stator, and only partially encompasses the rotor. This is the reason for the concave design of the mount.

The stator also may contain a magnetic flux guide in its outer sheath. This magnetic flux guide is obtained through metal plating, which guides the magnetic field. As a result, the magnetic field can be better and more efficiently used to move the rotor.

The rotor with the mount can also be removed radially. This is advantageous because a radial removal is simple, as explained above, for replacing the rotor if it malfunctions or becomes extremely dirty. This can also be carried out by untrained personnel.

The mount also may have at least one snap-fit connection for releasably attaching the mount to the control device. Such a snap-fit connection is a form-fitting connection, as explained above, which can also be released with little effort, but securely retains the rotor in the intended position when in operation.

The mount also may have a web structure, substantially for reasons of stability, and it is encompassed by an outer sheath. The rotor and the mount can thus be easily removed. The web structure has proven to be extremely advantageous when subjected to dynamic forces in compensating for inertia torques, in particular torsional inertia torques resulting from higher rotational rates of the rotor and a possible imbalance of the rotor. The web structure has also proven to be particularly advantageous for absorbing not only these radial forces, but also axial forces running along the rotational axis without becoming deformed in the case of an axial acceleration on an uneven street.

Furthermore, the rotor may have (for example) 14 permanent magnets and the stator may have (for example) 12 coils. This number of permanent magnets and coils has proven to be particularly advantageous in operation.

The stator and the control device are also sealed off from the rotor. This sealing can be obtained with a rubber seal, a metal seal, or some other seal. It should be hermetic enough that no moisture can enter the interior of this seal.

As explained above, the releasable connection can also be characterized by a snap-in connector.

Referring now to the figures, FIG. 1 shows a block diagram of the control device SG according to the present aspects in an ego vehicle EF with components connected thereto. The sensors S1 to S6 are connected to the control device SG. These sensors are environment sensors, for example, in the form of radar and/or lidar sensors, or a camera, for scanning the environment. The data from these sensors is preferably transmitted digitally to the control device, either as raw data or preprocessed. The control device contains the computing means, e.g. graphics processors, but other microcontrollers or microprocessors can also be used here for obtaining an interpretation of the environment from the data provided by the sensors S1 to S6. The control device can then decide, using artificial intelligence, to actuate an actuator AKT, e.g. for steering, braking, or acceleration, based on this interpretation of the environment, in order to control the vehicle autonomously, for example. Other types of sensors can also be connected to the control device SG. These include, e.g., inertia sensors, as well as data from other control devices, providing the control device SG with a complete overview of the functioning of the ego vehicle EF, so that it can make the right decision.

This can also mean a sensor system that records the vehicle occupants. The actuators can also be, e.g., passive detention means.

Figure 2:
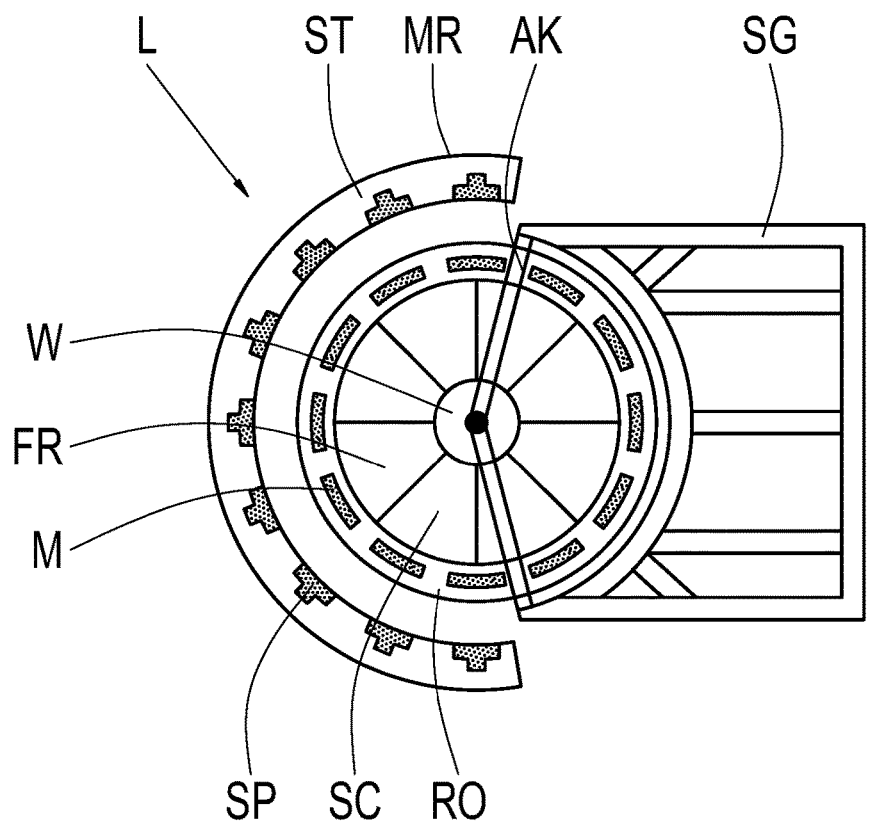
FIG. 2 shows a schematic top view of the ventilator according to the present aspects.

FIG. 2 shows a ventilator L for such a control device, that is designed according to the present aspects. The ventilator L first has a stator ST in the form of an open hollow cylinder. FIG. 2 shows a top view of the axial direction that enters the image plane. The stator ST therefore partially encompasses the rotor RO. The stator ST therefore also has a greater radius than the rotor RO. There are coils SP in the stator ST. The coils SP are supplied with current by an electrical circuit in the control device, such that a rotating magnetic field is generated that then draws the permanently excited rotor RO along with it. Because the coils SP are arranged in an open hollow cylinder, they are closer together than before, when a closed hollow cylinder was used. This results in the advantages specified above. The stator ST also has a magnetic flux guide MR, obtained through metal plating, that results in a better guidance of the magnetic flux. The metal plated magnetic flux guide also serves as a shield for the radiation fields caused by the coils SP.

There is an air gap between the stator ST and the rotor RO. This is necessary for the rotation of the rotor. The rotor RO itself has magnets M in its hollow cylinder, specifically permanent magnets that interact with the electromagnetic fields of the coils SP to enable the movement of the rotor RO. These magnets M are located in blind holes, for example, and fixed in place there. These magnets M are preferably arranged radially to the rotational axis of the rotor RO and in an alternating pattern with regard to their poles. This means that, when seen from the side, the north and south poles alternate successively. When seen from above, first there is a south pole, then a north pole, and then another south pole.

In the present case, the impeller FR with its blades SC is securely connected to the hollow cylinder of the rotor RO, e.g. in that this unit is integrally produced. As explained above, other connections can also be used, e.g. form, force, and/or materially bonded connections.

There is a hub N in the middle of the impeller FR, through which a metallic shaft also passes, which is not shown here. The webs of a suspension AH are connected to this shaft in order to securely connect this shaft to a mount that has a web structure SG. This mount can comprise a housing that protects the web structure from dirt, etc. This suspension AH can be connected to the mount at the bottom as well as at the top, seen in the axial direction. The webs as well as the suspension AH and the web structure SG are preferably made of ABS plastic. As a matter of course, other materials, such as a fiberglass reinforced ABS plastic or a metallic substance, can also be used.

Figure 3:
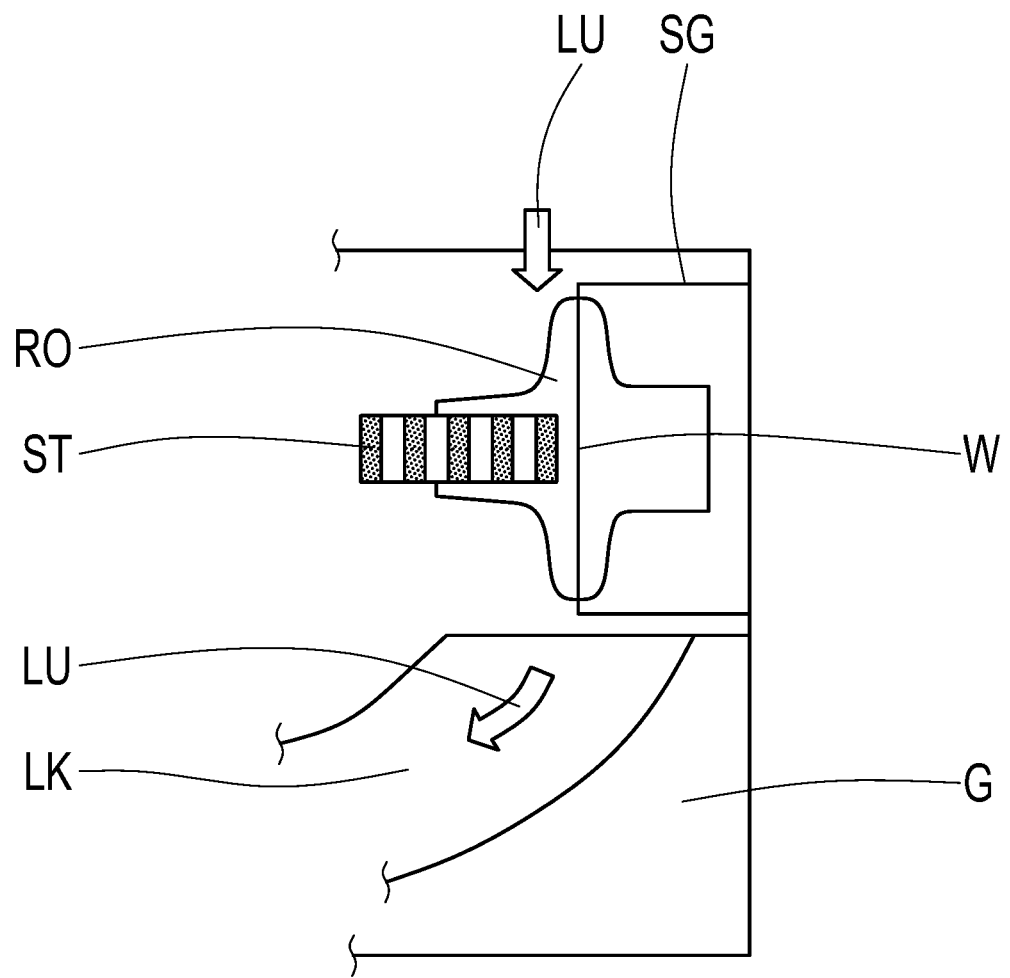
FIG. 3 shows a schematic side view of the ventilator according to the present aspects in the control device.

FIG. 3 shows a side view of the ventilator installed in the control device. The control device has a housing G that has an air channel that enters the housing from above, and then transitions into a channel LK above the ventilator, ultimately completing a 90° angle. The air flow LU is indicated by the arrow. This air flow is caused by the rotor RO, and in particular by its rotation. It is shown here that the shaft W passing through the rotor, as explained above, is connected to the web structure SG. The stator ST only partially encompasses the rotor RO here as well. The white and dark sections indicate schematically how the stator is provided with the various coils.

REFERENCE SYMBOLS

EF ego vehicle
S1-6 sensors
SG control device
AKT actuator
ST stator
RO rotor
SP coils
MR magnetic flux guide
L ventilator
FR impeller
SC blade
M magnets
SG web structure
AH suspension
LU air flow
W shaft
LK air channel
G housing

We claim:

1. A ventilator for a control device for a vehicle, comprising:
    a stator having a plurality of coils; and
    a rotor comprising a hollow cylinder,
    wherein an impeller has a plurality of blades, the impeller being coupled to the hollow cylinder such that a rotation of the hollow cylinder causes a rotation of the impeller,
    wherein the hollow cylinder has a plurality of magnets, and
    wherein the stator partially encompasses the rotor such that at least a portion of an outer radial surface of the rotor is uncovered by the stator in a radial direction,
    wherein at least a portion of the stator includes an arc of less than 360 degrees such that the portion of the outer radial surface of the rotor is unencompassed by the stator.

2. The ventilator according to claim 1, wherein the stator includes a second hollow cylinder, the second hollow cylinder being an open hollow cylinder.

3. The ventilator according to claim 1, wherein the impeller is rotatably mounted on a shaft, wherein the shaft is connected to a mount via a suspension, and wherein the mount is concave and partially encompasses the rotor.

4. The ventilator according to claim 3, wherein the mount has a web structure.

5. The ventilator according to claim 3, wherein the rotor is removable radially with the mount.

6. The ventilator according to claim 1, wherein the stator has a magnetic flux guide on an outer sheath.

7. The ventilator according to claim 1, wherein the rotor consists of 14 permanent magnets, and wherein the stator consists of 12 coils.

8. A control device, comprising:
    a ventilator comprising a stator having a plurality of coils and a rotor comprising a hollow cylinder,
    wherein an impeller has a plurality of blades, the impeller being coupled to the hollow cylinder such that a rotation of the hollow cylinder causes a rotation of the impeller,
    wherein the hollow cylinder has a plurality of magnets, and
    wherein the stator partially encompasses the rotor such that at least a portion of an outer radial surface of the rotor is uncovered by the stator in a radial direction,
    wherein the rotor and a mount are laterally received by a housing for the control device, and
    wherein at least a portion of the stator includes an arc of less than 360 degrees such that the portion of the outer radial surface of the rotor is unencompassed by the stator.

9. The control device according to claim 8, wherein the stator and the housing for the control device are collectively sealed against the rotor.

10. The control device according to claim 8, wherein the stator includes a second hollow cylinder, the second hollow cylinder being an open hollow cylinder.

11. The control device according to claim 8, wherein the impeller is rotatably mounted on a shaft, wherein the shaft is connected to the mount via a suspension, and wherein the mount is concave and partially encompasses the rotor.

12. The control device according to claim 8, wherein the mount has a web structure.

13. The control device according to claim 8, wherein the stator has a magnetic flux guide on an outer sheath.

14. The control device according to claim 8, wherein the rotor is removable radially with the mount.

15. The control device according to claim 8, wherein the rotor consists of 14 permanent magnets, and wherein the stator consists of 12 coils.

* * * * *